United States Patent [19]

Staubach

[11] Patent Number: 4,908,189
[45] Date of Patent: Mar. 13, 1990

[54] CONCENTRIC TUBE OZONATOR

[75] Inventor: Ernst J. Staubach, Loveland, Ohio

[73] Assignee: Henkel Corporation, Ambler, Pa.

[21] Appl. No.: 219,525

[22] Filed: Jul. 15, 1988

[51] Int. Cl.⁴ .................. B01J 19/08; B01J 19/12; C01B 13/11

[52] U.S. Cl. .................. 422/186.19; 422/186.18; 422/186.2; 422/186.11

[58] Field of Search .................. 422/186.19, 186.18

[56] References Cited

U.S. PATENT DOCUMENTS

| | | | |
|---|---|---|---|
| 1,037,500 | 9/1912 | Leggett | 422/186.18 |
| 1,050,260 | 1/1913 | Walden | 422/186.19 |
| 2,615,841 | 10/1952 | Thorp et al. | |
| 2,822,327 | 2/1958 | Hammesfuhr et al. | 422/186.18 |
| 3,214,364 | 10/1965 | Vantuyle et al. | 422/186.19 |
| 3,616,382 | 10/1971 | Bartle et al. | |
| 3,622,492 | 11/1971 | Kinney | |
| 3,677,931 | 7/1972 | O'Hare | 422/186.18 |
| 3,766,051 | 10/1973 | Bollyky | |
| 3,836,786 | 9/1974 | Lowther | |
| 3,883,492 | 9/1974 | Bollyky | |
| 3,899,683 | 8/1975 | Lowther | |
| 3,899,685 | 8/1975 | Francis et al. | 422/186.19 |
| 3,954,586 | 5/1976 | Lowther | |
| 3,967,131 | 6/1976 | Slipiec et al. | 422/186.18 |
| 3,996,122 | 12/1976 | Lowther | |
| 3,996,474 | 12/1976 | Lowther | 204/176 |
| 4,011,165 | 3/1977 | Filippov et al. | 250/527 |
| 4,048,668 | 9/1977 | Von Bargen et al. | 361/235 |
| 4,049,707 | 9/1977 | Harter et al. | 422/186.04 |
| 4,079,260 | 3/1978 | Dmitriev et al. | 422/186.18 |
| 4,090,960 | 5/1978 | Cooper | 204/176 |
| 4,159,425 | 6/1979 | Lowther | 422/186.19 |
| 4,216,096 | 8/1980 | Pare' et al. | 313/217 |
| 4,232,229 | 11/1980 | Tanaka et al. | 422/186.19 |
| 4,233,126 | 11/1980 | Garcia | 204/176 |
| 4,283,291 | 8/1981 | Lowther | 422/907 |
| 4,317,067 | 2/1982 | Fitzsimmons et al. | |
| 4,320,301 | 3/1982 | Kogelschatz et al. | |
| 4,385,261 | 5/1983 | Kogelschatz et al. | |
| 4,461,744 | 7/1984 | Erni et al. | |
| 4,504,446 | 3/1985 | Kunicki et al. | |
| 4,587,591 | 2/1986 | Adatto et al. | |
| 4,656,010 | 4/1987 | Leitzke et al. | 422/186.18 |

Primary Examiner—Howard J. Locker
Attorney, Agent, or Firm—Ernest G. Szoke; Wayne C. Jaeschke

[57] ABSTRACT

A concentric tube ozonator which is designed from theoretical considerations to produce ozone efficiently with minimum electrical power consumption. Concentric tube assemblies in the ozonator are designed for ease of construction and replacement of the components thereof, with each concentric tube assembly providing for the relatively precise positioning of the components therein as is required for proper and efficient operation of the ozonator. Each concentric tube assembly is constructed with an outer tubular metal electrode and an inner tubular metal electrode positioned concentrically within the outer tubular electrode. A glass dielectric tube is positioned concentrically and centrally between the outer and inner tubular electrodes. This construction provides an inner concentric annular electrical field discharge gap between the glass dielectric tube and the inner tubular electrode, and an outer concentric annular electric discharge gap between the glass dielectric tube and the outer tubular electrode, in which the feed gas is converted into ozone. The efficiency of the ozonator is optimized by constructing the ozonator such that the inner and outer annular discharge gaps are maintained in the range of 0.45 mm to 0.55 mm, preferably at 0.5 mm, to provide a minimum discharge gap to convert oxygen to ozone to minimize the voltages required during operation thereof.

13 Claims, 2 Drawing Sheets

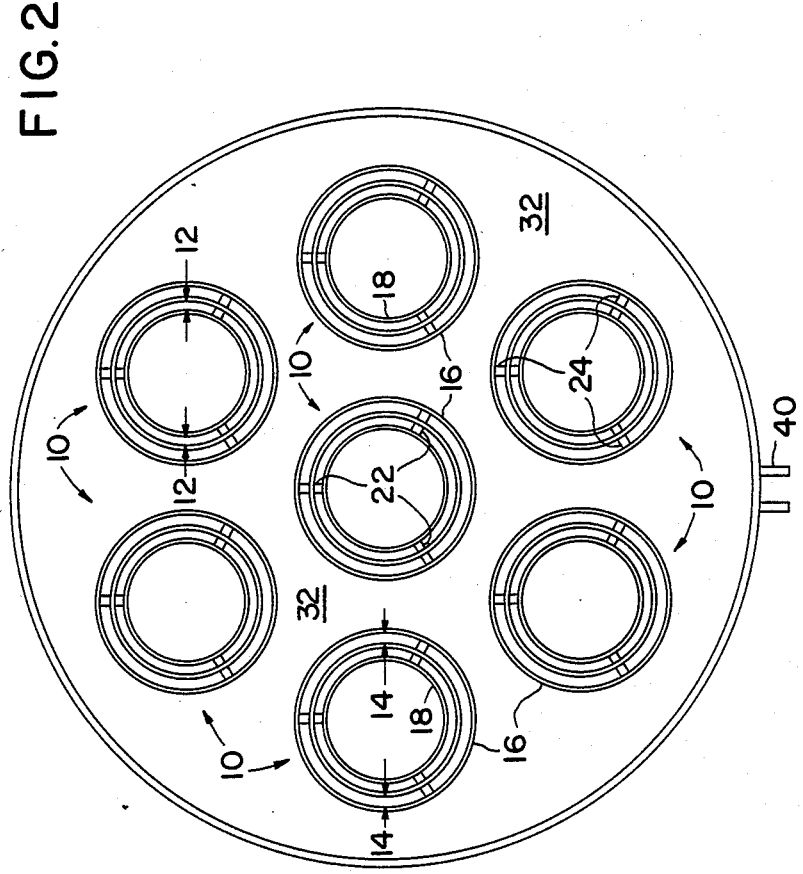

CONCENTRIC TUBE OZONATOR

BACKGROUND OF THE INVENTION

1. Field of the Invention

The present invention relates generally to an improved concentric tube ozonator which is designed from theoretical considerations to produce ozone efficiently with minimum electrical power consumption. More particularly, the subject invention pertains to an improved and relatively simple ozonator design as described wherein concentric tube assemblies in the ozonator are designed for ease of construction and replacement of the components thereof, with the concentric tube assemblies providing for the relatively precise positioning of the components therein, as is required for proper and efficient operation of the ozonator.

2. Discussion on of the Prior Art

Van Tuyle U.S. Pat. No. 3,214,364 is of interest to the present invention by disclosing a prior art commercial ozonator design. An outer metal tube constitutes one electrode and encloses a glass tube which is the dielectric of the ozonator. The outside diameter of the glass tube is somewhat smaller than the inside diameter of the metal tube, thus providing an annular space through which the gases being ozonized pass. An inner electrode is positioned within the dielectric glass tube, and is formed of a perforated member such as a grid or screen which is spaced from the inner surface of the dielectric tube. The glass tube employed is one having a wall thickness of not over about 2.25 mm and is described as being as thin as manufacturing techniques will permit, with a practical lower limit being about 1.5 mm Moreover, the glass tube, instead of being closed at one or both ends, is left open at the gas entrant end, while the opposite end is provided with a restricting device arranged to permit only a predetermined portion of the entrant feed gases (of the order of 30-70% thereof) to pass through the tube in contact with the perforate member comprising the inner electrode. The balance of the gases pass through the annular space between the outer metal tube and the inner glass tube. The diameters of the tubes are so selected that the width of the annular space therebetween is held below about 2.5 mm and preferably below about 2 mm, with a practical lower limit being giving as about 1 mm. Accordingly, this prior art approach discloses and teaches much larger annular discharge gaps than the present invention, and moreover the design is more complex than that of the present invention and involves a grid or screen inner electrode.

Harter et al U.S. Pat. No. 4,049,707 is also of interest to the present invention, and discloses an ozonator design having a first flat plate electrode, a composite mica glass dielectric structure located along the side of and spaced from the first plate electrode so as to define a gap between the first electrode and the dielectric structure, and a second flat plate electrode. The gap is closed off by a flexible seal permitting the thickness of the gap to be adjusted, preferably in relation to the operating parameters of the equipment used to power the apparatus and to the characteristics of the product or products produced. In actual practice, ozonator designs having flat plate electrodes and dielectrics similar to the Harter et al patent have proven to be rather difficult to adjust and maintain in proper operation. However, this patent is of particular interest in disclosing that the flat discharge gap of the ozonator should be between 0.25 and 0.50 mm to maximize ozone product efficiency.

Tanaka et al U.S. Pat. No. 4,232,229 is also of interest to the present invention, and discloses a tubular ozonator design which includes a pair of spaced tubular electrodes including a ground electrode and a high voltage electrode, and a tubular dielectric substrate disposed between the ground electrode and the high voltage electrode. A perforated metal substrate is placed in the gap space between the ground electrode and the dielectric substrate, and a first spacer is placed between the perforated metal substrate and the dielectric substrate for maintaining a constant separation gap therebetween. A second spacer is disposed between the perforated metal substrate and the grounding electrode to maintain the perforated metal substrate in proper position between the dielectric substrate and the grounding electrode, wherein a uniform separation distance promoting a uniform electrical discharge is maintained between the perforated metal substrate and the dielectric substrate by the first and second spacers. This patent is of particular interest in disclosing a preferred discharge gap of 0.5 mm. However, this particular ozonator design is relatively inefficient in several respects when compared to the present invention. The design is such as to present only a single annular discharge gap, rather than the more efficient dual annular discharge gaps of the present invention, and moreover requires a perforated metal net spacer in the middle of the discharge gap.

SUMMARY OF THE INVENTION

Accordingly, it is a primary object of the present invention to provide an improved design for a concentric tube ozonator which is designed from theoretical considerations to produce ozone efficiently with minimum electrical power consumption.

A further object of the subject invention is the provision of an improved and relatively simple ozonator design wherein the concentric tube assemblies in the ozonator are designed for ease of construction and replacement of the components thereof, with each concentric tube assembly providing for the relatively precise positioning of the components therein as is required for proper and efficient operation of the ozonator.

In accordance with the teachings herein, the present invention provides an ozonator constructed of a plurality of concentric tube assemblies in which a feed gas containing oxygen is converted into ozone in inner and outer concentric annular electrical field discharge gaps formed therein. Each concentric tube assembly is designed without metal screens or nets therein. Each concentric tube assembly is constructed with an outer tubular metal electrode and an inner tubular metal electrode positioned concentrically within the outer tubular electrode. The inner tubular metal electrode is capped on one end. A glass dielectric tube is positioned concentrically and centrally between the outer and inner tubular electrodes. This construction provides an inner concentric annular electrical field discharge gap between the glass dielectric tube and the inner tubular electrode, and an outer concentric annular electric discharge gap between the glass dielectric tube and the outer tubular electrode, in which the feed gas is converted into ozone.

The efficiency of the ozonator is optimized by constructing the ozonator such that the inner and outer annular discharge gaps are maintained in the range of 0.45 mm to 0.55 mm, preferably at 0.5 mm, to provide a minimum discharge gap to convert oxygen to ozone to minimize the voltages required during operation thereof. The 0.5 mm discharge gap also provides a sufficiently large electrical discharge gap to provide a sufficiently high voltage thereacross to cause and result in the electron transitions necessary to produce ozone from oxygen, but does not result in an unduly high voltage thereacross. A substantially smaller discharge gap would not provide a sufficient voltage to cause the electron transitions necessary for the production of ozone, while a substantially larger discharge gap would provide a higher voltage than is required for the electron transitions, and would result in a higher consumption of electrical power than is necessary for the production of ozone. As a practical matter, the actual size of the discharge gap will vary from point to point in the concentric tube assemblies because of slightly varying tolerances in the components thereof defining the discharge gaps.

The glass dielectric tube is also selected to have a thickness of less than 1.1 mm to minimize the voltage required for the production of ozone. The thickness of the dielectric tube is directly proportional to the magnitude of the voltage required to produce ozone in the annular discharge gaps, with a thinner dielectric requiring a smaller voltage for ozone production. Ideally, the dielectric tube thickness should be as thin as possible to minimize the operating voltage requirements. However, as a practical matter, the dielectric tube thickness must be sufficiently large to prevent breakage of the glass dielectric tube, both during assembly of the ozonator and also during operation thereof. With these contrary considerations, the glass dielectric tube has been selected to have a thickness of less than 1.1 mm, and preferably a thickness of 1 mm.

The ozonator is constructed with a common feeder gas inlet at one axial end of the concentric tube assemblies, and a common ozone gas outlet at the second, opposite axial end of the concentric tube assemblies. The feed gas can be atmospheric air, or pure oxygen, or other mixtures of gas containing oxygen such as 50% $O_2$, 50% $CO_2$. After passing through the ozonator, the ozone content of the outlet gas is typically up to 5%, depending upon the operational parameters of the ozonator. The feed gas is fed to the ozonator at a positive pressure, typically 10 to 15 psi, with higher gas feed pressures generally requiring a slightly higher operational voltage in the ozonator.

A periodic power supply is provided for applying periodic electrical power between the inner and outer concentric tubular electrodes during operation of the ozonator. The periodic electric power supply might supply an AC voltage, such as one derived from a 60 Hz power supply, or might be a high frequency pulse power supply, or any other suitable electrical waveform, typically supplied to the ozonator through a step-up voltage transformer which has its high voltage secondary winding coupled to the ozonator. One prototype of the present invention which is described in detail herein was constructed and operated with a 60 Hz 12 KV power supply derived from standard 60 Hz line power.

Moreover, in preferred embodiments, for safety reasons, the electrical power supply is preferably connected to ground each outer tubular metal electrode, and the periodic power supply is coupled to supply periodic electrical power to each inner tubular metal electrode.

A cooling system for the ozonator includes a cooling housing encompassing the concentric tube assemblies, and a coolant is circulated within the cooling housing around the outsides of the outer tubular electrodes for cooling thereof during operation of the ozonator. As a practical matter, heat generated during the electrical discharge operation of the ozonator must be removed by a cooling system as heat generally reconverts ozone back to normal oxygen, and thus must be removed to maintain efficient operation of the ozonator. One of the beneficial and advantageous results of the design of the present invention is that the relatively small discharge gaps and thin dielectric allow the ozonator to be cooled relatively efficiently by a coolant, typically water, circulated around the exterior surfaces of the outer tubular electrodes. The coolant could also be circulated within the inner tubular electrode, but this results in unnecessary complications which could result in possible leakage and operational problems.

In greater detail, in the design of one embodiment described herein, a plurality of spacers are provided around and along the length of each inner tubular metal electrode to properly position the glass dielectric tube relative to the inner tubular metal electrode. A plurality of spacers are also provided around and along the length of each glass dielectric tube to properly position the outer tubular metal electrode relative to the glass dielectric tube. The spacers can be simply short pieces of Teflon tape spaced around the circumference of each element. Moreover, the outer tubular metal electrodes and the inner tubular metal electrodes preferably are stainless steel tubes, and the glass dielectric tube comprises borosilicate glass as is available under the trademark Pyrex ®. As a practical matter, each glass dielectric tube is normally selected to have an outer diameter between 25 mm and 50 mm, and a length between 1 and 10 feet, depending upon the particular application and its requirements, to provide for the practical handling thereof during construction of and maintenance performed on the ozonator.

In one designed embodiment of the present invention, each inner tubular metal electrode was selected to have a 32 mm outer diameter, each borosilicate glass dielectric tube was selected to have a 35 mm outer diameter and a 33 mm inner diameter (and thus a thickness of 1 mm), and each stainless steel tubular electrode was selected to have a 36 mm inner diameter, which results in 0.5 mm annular electric discharge gaps defined between each electrode and the dielectric tube. The lengths of the dielectric glass tubes were selected to be 6 feet, and the electrode tubes were five feet.

BRIEF DESCRIPTION OF THE DRAWINGS

The foregoing objects and advantages of the present invention for an improved concentric tube ozonator may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 2 is a sectional view along arrows 2—2 in FIG. 1, and illustrates an axial sectional view through the ozonator.

DETAILED DESCRIPTION OF THE DRAWINGS

Theoretical Considerations

Figure 1:
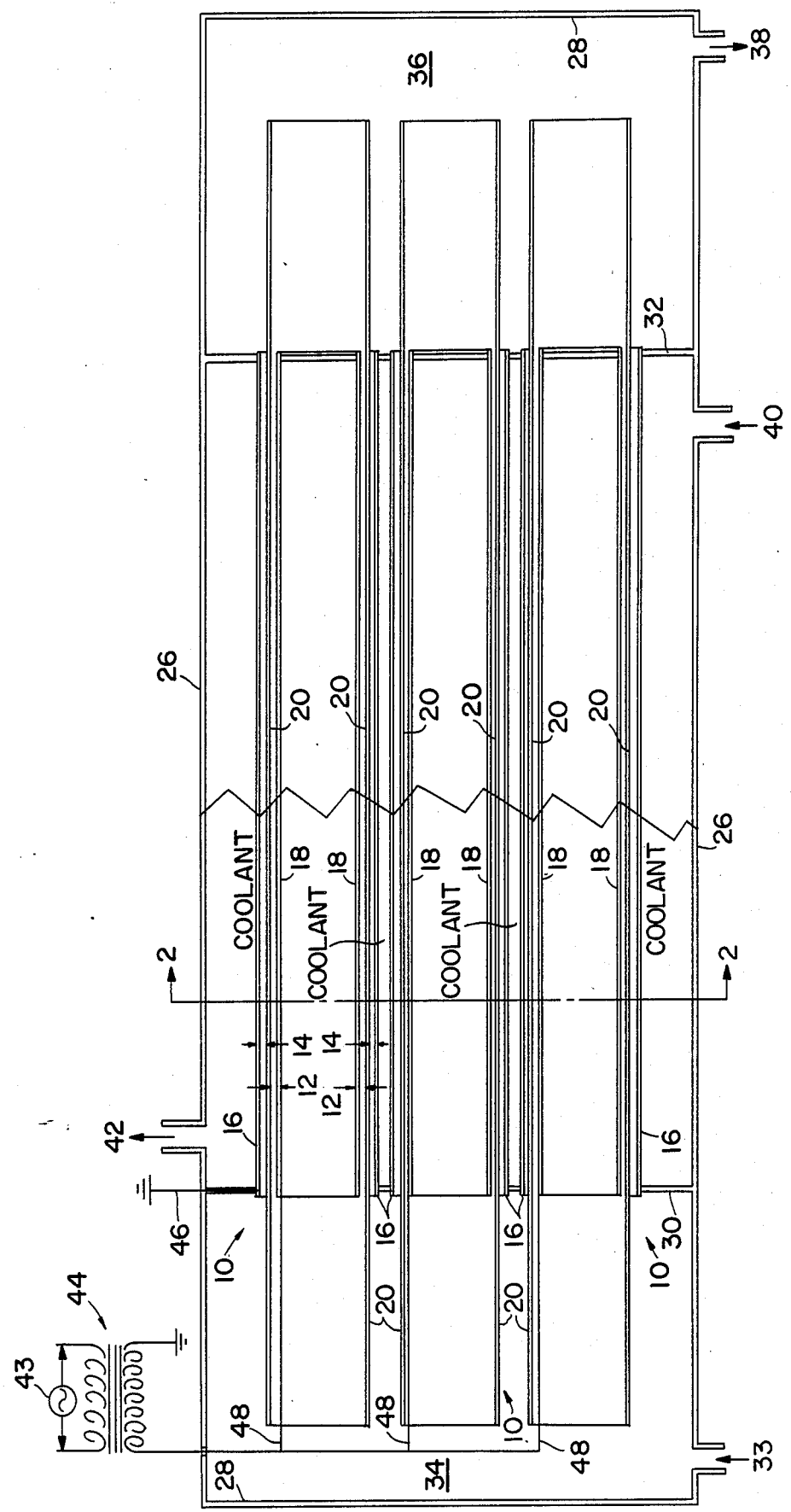
FIG. 1 is a partially sectional elevational view of an exemplary embodiment of an improved concentric tube ozonator constructed pursuant to the teachings of the present invention, and illustrates many of the principles of construction thereof.

It is generally acknowledged that the electrical efficiency of commercially available ozonators is very poor and that this deficiency greatly restricts their application.

One mathematical model that was proposed to predict the performance of an ozonator is:

$$C = K_1 (1 - e^{-K_2 \frac{P}{Q}})$$

p1 C=ozone concentration, Lb/m$^3$
 $K_1$=a stationary constant
 $K_2$=a decomposition constant
 P=power input to the ozonator, watts
 Q=gas flow through the ozonator, m$^3$/hr.

Later investigators modified this model somewhat in an effort to accurately account for the degradation of the ozone caused by the operating temperature inside the ozonator. In none of these modifications, however, have the principles involved in the model been substantially changed.

Note that this model does not explicitly contain any factors attributable to the physical design of the ozonator. To increase the concentration of ozone requires increasing the value of P/Q. To do this one must either increase the power input, P, or decrease the gas flowrate, Q, or a combination of the two. Of course, increasing the P/Q ratio raises the temperature inside the ozonator which lowers the values of $K_2$. This somewhat offsets the desired effect of raising ozone concentration, therefore, actual operating conditions are determined by economics.

The P/Q ratio is not determined by the physical design of the ozonator but by Paschen's law and the operator's selection of power input and gas throughput. The voltage drop per unit path through a gas is determined solely by the nature of the gas and its density. Narrowing the gap in an ozonator reduces the gas path and therefore lowers the voltage required to induce current flow. However, the quantity of gas exposed to the electrons has also been reduced so the P/Q ratio has not been changed. Increasing the pressure increases the amount of gas in the gap, but it also raises the voltage required to induce current flow, so again the P/Q ratio is not substantially changed.

Referring specifically to FIGS. 1 and 2, the present invention provides an improved design for a concentric tube ozonator which is designed from theoretical considerations to produce ozone efficiently with minimum electrical power consumption. In this design, concentric tube assemblies 10 in the ozonator are designed for ease of construction and replacement of the components thereof, with each concentric tube assembly providing for the relatively precise positioning of the components therein as, is required for proper and efficient operation of the ozonator. Within each concentric tube assembly, a feed gas containing oxygen is converted into ozone in inner 12 and outer 14 concentric annular electrical field discharge gaps formed therein. Each concentric tube assembly is designed without any wire screens or nets therein. Each concentric tube assembly is constructed with an outer tubular metal electrode 16 and an inner tubular metal electrode 18 positioned concentrically within the outer tubular electrode. The inner tubular metal electrode is capped on one end. A glass dielectric tube 20 is positioned concentrically and centrally between the outer and inner tubular electrodes. This construction provides the inner concentric annular electrical field discharge gap 12 between the glass dielectric tube and the inner tubular electrode, and the outer concentric annular electric discharge gap 14 between the glass dielectric tube and the outer tubular electrode, in which the feed gas is converted into ozone.

A plurality of spacers 22 are provided around and along the length of each inner tubular metal electrode to properly position the glass dielectric tube relative to the inner tubular metal electrode, and a plurality of spacers 24 are also provided around and along the length of each glass dielectric tube to properly position the outer tubular metal electrode relative to the glass dielectric tube. In one embodiment, the spacers were simply short pieces of 0.5 mm thick Teflon tape. These spacers can be provided along the lengths of the tubes, as at the ends and center, and preferably include three spacers equally spaced around the circumference of the tube, as illustrated. Moreover, the outer and inner tubular metal electrodes are preferably stainless steel tubes, and the glass dielectric tube comprises borosilicate glass as is available under the trademark Pyrex ®.

The efficiency of the ozonator is optimized by constructing the ozonator such that the inner and outer annular discharge gaps 12, 14 are in the range of 0.45 mm to 0.55 mm, preferably at 0.5 mm, to provide a minimum discharge gap to convert oxygen to ozone to minimize the voltage required during operation. The 0.5 mm discharge gap provides a sufficiently large electrical discharge gap to provide a sufficiently high voltage thereacross to cause and result in the electron transitions necessary to produce ozone from oxygen, but does not result in an unduly high voltage thereacross. As a practical matter, the actual size of the discharge gap will vary from point to point in the concentric tube assemblies because of slightly varying tolerances in the components thereof defining the discharge gaps.

The glass dielectric tube 20 is also selected to have a thickness of less than 1.1 mm to minimize the voltage required for the production of ozone. The thickness of the dielectric tube is directly proportional to the magnitude of the voltage required to produce ozone in the annular discharge gaps, with a thinner dielectric requiring a smaller voltage for ozone production. Ideally, the dielectric tube thickness should be as thin as possible to minimize the operating voltage requirements. However, as a practical matter, the dielectric tube thickness must be sufficiently large to prevent breakage of the glass dielectric tube, both during assembly of the ozonator and also during operation thereof. With these contrary considerations, the glass dielectric tube has been selected to have a thickness of less than 1.1 mm, and preferably a thickness of 1 mm.

The ozonator is constructed with a cylindrical outer housing 26 having end plates 28. Two partition walls 30, 32, having nine circular mounting apertures therein for the nine concentric tubular assemblies, are mounted within the cylindrical housing 26, one near each end thereof. The outer cylindrical electrodes and the end plates 28 are sealed relative to each other by welding or rolling. A feed gas inlet 33 is provided in the left (FIG.

1) inlet end of the cylindrical housing 26 and provides a feeder gas manifold 34 to the left of partition wall 30, from which feed gas under pressure, typically 10 to 15 psi, can flow through the annular discharge gaps 12, 14 to the right (FIG. 1) ozone outlet end of the ozonator defined to the right of partition 32 which provides an ozone outlet manifold 36, from which the ozone outlet gas flows to an ozone gas outlet 38. The feed gas can be atmospheric air, or pure oxygen, or other mixtures of gas containing oxygen such as 50% $O_2$, 50% $CO_2$. After passing through the ozonator the ozone content of the outlet gas is typically up to 5%, depending upon the operational parameters of the ozonator.

The outer cylindrical housing 26 and the volume between the two partition walls 30 and 32 and outside of the outer cylindrical electrodes 16 define a cooling system for the ozonator. A coolant, typically water, is circulated from a coolant inlet 40 within the cooling housing around the outsides of the outer tubular electrodes for cooling thereof to a coolant outlet 42. As a practical matter, heat generated during the electrical discharge operation of the ozonator must be removed by a cooling system as heat generally reconverts ozone back to normal oxygen, and thus must be removed to maintain efficient operation of the ozonator. One of the beneficial and advantageous results of the design of the present invention is that the relatively small discharge gaps and thin dielectric allow the ozonator to be cooled more efficiently by the coolant circulated around the exterior surfaces of the outer tubular electrodes.

A periodic power supply 43 is provided for applying periodic electrical power between the inner and outer concentric tubular electrodes during operation of the ozonator. The periodic electric power supply might supply an AC voltage, such as one derived from a 60 Hz power supply, or might be a high frequency pulse power supply, or any other suitable electrical waveform, typically supplied to the ozonator through a step-up voltage transformer 44 which has its high voltage secondary winding coupled to the ozonator. One prototype of the present invention which is described in detail herein was constructed and operated with a 60 Hz 12 KV power supply, derived from standard 60 Hz line power. In preferred embodiments, for safety reasons, the electrical power supply is preferably connected to ground, as at 46, to ground each outer tubular metal electrode 16, and the periodic power supply is coupled, as through leads 48, to supply periodic electrical power to each inner tubular metal electrode 18.

In one designed embodiment of the present invention which has been constructed and tested, each inner tubular metal electrode was selected to have a 32 mm outside diameter, each borosilicate glass dielectric tube was selected to have a 35 mm outer diameter and 33 mm inner diameter (and thus a thickness of 1 mm), and each stainless steel tubular outer electrode was selected to have a 36 mm inner diameter, which results in 0.5 mm annular electric discharge gaps being defined therein.

The length of the glass dielectric tubes was selected to be six foot. As illustrated in FIG. 1, the ends of the glass dielectric tubes extend beyond the ends of the tubular electrodes, typically by six inches, to prevent an electrical discharge around the ends of the dielectrics. For different embodiments, as a practical matter, each glass dielectric tube would normally be selected to have an outer diameter between 25 mm and 50 mm, and a length between 1 and 10 feet, to provide for the practical handling thereof during construction of and maintenance on the ozonator.

The following four TABLES give comparative test data on the production of ozone in a conventional commercial ozonator of the type disclosed and taught by Van Tuyle U.S. Pat. No. 3,214,364, which is commercially available from Emery Industries, Inc., Cincinnati, Ohio, compared with a prototype ozonator of the type disclosed and taught herein and specifically described in the previous paragraph, which was also developed by Emery Industries, Inc. The power supplies for both ozonators were derived from a 60 Hz line voltage, applied through conventional power supply circuits through a step-up transformer to each ozonator. The conventional ozonator was constructed with 102 tube assemblies and the prototype with 110 tube assemblies. Since the construction and surface area of the electrical discharge gaps in each ozonator are different, the comparative data was generated for identical ratios of the power (KW) to area of dielectric ($m^2$), as shown in the third column of each table. The conventional ozonator which is commercially available from Emery Industries Inc. is designated C (for Conventional) in the TABLES and the prototype of the present invention is designated P (for Prototype).

The power into each ozonator is identical for each TABLE, as indicated by the first two columns, and the four TABLES are for four sets of oxygen feed rates through the two ozonators, which was varied by an adjustable flow valve near the outlet of the ozonator. The feed gas was pure oxygen, supplied at approximately 10 psi, with the pressure at the ozonator inlet varying up or down slightly therefrom in accordance with the desired flow rate through the ozonator, and the feed rates at the top of each TABLE are given in Pounds Per Hour (PPH) of $O_2$.

The last column of each TABLE % compares the ratio of the Kilowatt-Hour (KWH) power to pounds of ozone (Lb $O_3$) produced by each ozonator, with a positive (+) % indicating more efficient production of ozone by the prototype.

The four TABLES indicate that the prototype ozonator operated more efficiently than the conventional ozonator in almost all cases. The less efficient operation of the prototype ozonator in the first row of the first two TABLES is believed to be explainable by the fact that the 6.8 KW power into the prototype ozonator is simply too low a power input for the prototype and its particular power control circuit.

TABLE 1

225 PPH $O_2$ for Conventional Ozonator
78.8 PPH $O_2$ for Prototype Ozonator

| POWER (KW) | | | % $O_3$ | | Lb $O_3$/hr/$m^2$ | | KWH/Lb $O_3$ | | |
|---|---|---|---|---|---|---|---|---|---|
| P | C | KW/$m^2$ | P | C | P | C | P | C | % |
| 6.80 | 20 | 0.367 | 2.58 | 2.60 | 0.1103 | 0.1075 | 3.34 | 3.32 | −0.6 |
| 10.2 | 30 | 0.551 | 3.60 | 3.53 | 0.1539 | 0.1459 | 3.60 | 3.79 | +5.01 |
| 13.5 | 40 | 0.735 | 4.48 | 4.17 | 0.1915 | 0.1724 | 3.82 | 4.30 | +11.16 |

TABLE 1-continued

| 225 PPH O$_2$ for Conventional Ozonator 78.8 PPH O$_2$ for Prototype Ozonator | | | | | | | | | |
|---|---|---|---|---|---|---|---|---|---|
| POWER (KW) | | | % O$_3$ | | Lb O$_3$/hr/m$^2$ | | KWH/Lb O$_3$ | | |
| P | C | KW/m$^2$ | P | C | P | C | P | C | % |
| 16.9 | 50 | 0.918 | 5.19 | 4.61 | 0.2219 | 0.1965 | 4.13 | 4.80 | +13.96 |

TABLE 2

| 400 PPH O$_2$ for Conventional Ozonator 135 PPH O$_2$ for Prototype Ozonator | | | | | | | | | |
|---|---|---|---|---|---|---|---|---|---|
| POWER (KW) | | | % O$_3$ | | Lb O$_3$/hr/m$^2$ | | KW H/Lb O$_3$ | | |
| P | C | KW/m$^2$ | P | C | P | C | P | C | % |
| 6.80 | 20 | 0.367 | 1.61 | 1.81 | 0.1179 | 0.1330 | 3.13 | 2.77 | −13 |
| 10.2 | 30 | 0.551 | 2.31 | 2.29 | 0.1692 | 0.1682 | 3.27 | 3.27 | 0 |
| 13.5 | 40 | 0.735 | 2.96 | 2.71 | 0.2468 | 0.1991 | 3.38 | 3.68 | +8.15 |
| 16.9 | 50 | 0.918 | 3.56 | 3.13 | 0.2607 | 0.2300 | 3.52 | 3.98 | +11.56 |

TABLE 3

| 490 PPH O$_2$ for Conventional Ozonator 166.7 PPH O$_2$ for Prototype Ozonator | | | | | | | | | |
|---|---|---|---|---|---|---|---|---|---|
| POWER (KW) | | | % O$_3$ | | Lb O$_3$/hr/m$^2$ | | KW H/Lb O$_3$ | | |
| P | C | KW/m$^2$ | P | C | P | C | P | C | % |
| 6.80 | 20 | 0.367 | 1.38 | 1.38 | 0.1248 | 0.1242 | 2.96 | 2.97 | +0.3 |
| 10.2 | 30 | 0.551 | 2.00 | 1.81 | 0.1809 | 0.1629 | 3.06 | 3.38 | +9.47 |
| 13.5 | 40 | 0.735 | 2.54 | 2.22 | 0.2297 | 0.1998 | 3.19 | 3.67 | +13.08 |
| 16.9 | 50 | 0.918 | 3.00 | 2.61 | 0.2713 | 0.2369 | 3.38 | 3.88 | +12.89 |

TABLE 4

| 600 PPH O$_2$ for Conventional Ozonator 206 PPH O$_2$ for Prototype Ozonator | | | | | | | | | |
|---|---|---|---|---|---|---|---|---|---|
| POWER (KW) | | | % O$_3$ | | Lb O$_3$/hr/m$^2$ | | KW H/Lb O$_3$ | | |
| P | C | KW/m$^2$ | P | C | P | C | P | C | % |
| 6.80 | 20 | 0.367 | 1.16 | 1.10 | 0.1296 | 0.1212 | 2.84 | 3.00 | +5.33 |
| 10.2 | 30 | 0.551 | 1.71 | 1.55 | 0.1911 | 0.1708 | 2.90 | 3.21 | +9.66 |
| 13.5 | 40 | 0.735 | 2.19 | 1.91 | 0.2447 | 0.2105 | 2.99 | 3.48 | +14.08 |
| 16.9 | 50 | 0.918 | 2.59 | 2.26 | 0.2894 | 0.2491 | 3.17 | 3.71 | +14.55 |

The above data is believed to prove fairly conclusively that the present invention, developed by Emery Industries, Inc., provides a more efficient design for an ozonator than the ozonator now commercially available from Emery Industries, Inc. Moreover, commercial ozonators draw and use relatively large quantities of electrical power during the production of ozone, and so differences of several percentage points (up to 14.55% in TABLE 4) translate into considerable savings in the amount and cost of electrical power used in ozone production.

While several embodiments and variations of the present invention for an improved concentric tube ozonator are described in detail herein, it should be apparent that the disclosure and teachings of the present invention will suggest many alternative designs to those skilled in the art.

What is claimed is:

1. An ozonator designed to produce ozone efficiently with minimum electrical power consumption, comprising a plurality of concentric tube assemblies forming the ozonator in which a feed gas containing oxygen is converted into ozone in inner and outer concentric annular electrical field discharge gaps formed therein, with each concentric tube assembly being designed to provide for replacement of the components thereof and also for precise positioning of the components thereof for efficient operation of the ozonator, wherein each concentric tube assembly comprises an outer tubular metal electrode, an inner tubular metal electrode positioned concentrically within the outer tube electrode, and a glass dielectric tube positioned concentrically and centrally between said outer tubular electrode and said inner tubular electrode to provide an inner concentric annular electrical field discharge gap between said glass dielectric tube and said inner tubular electrode and an outer concentric annular electric discharge gap between said glass dielectric tube and said outer tubular electrode, in which feed gas is converted into ozone, each inner and outer annular discharge gap being in the range o 0.45 mm to 0.55 mm to provide a minimum gap to convert oxygen to ozone to minimize the voltage required to produce ozone, said glass dielectric tube having a thickness of less than 1.1 mm to minimize the voltage required to produce ozone, a common feeder gas inlet at a first axial end of the concentric tube assemblies, and a common ozone gas outlet at the second, opposite axial end of the concentric tube assemblies, a periodic power supply for applying a periodic electrical power supply between the inner and outer concentric tubular electrodes during operation of the ozonator, and a cooling system for the ozonator defining a cooling housing encompassing the concentric tube assemblies such that a coolant can circulate in said cooling housing and around the outsides of the outer tubular electrodes for cooling thereof during operation of the ozonator.

2. An ozonator designed to produce ozone efficiently with minimum electrical power consumption, as claimed in claim 1, including a plurality of spacers provided around and along the length of each inner tubular metal electrode to properly position the glass dielectric tube relative to the inner tubular metal electrode, and a plurality of spacers provided around and along the length of each glass dielectric tube to properly position the outer tubular metal electrode relative to the glass dielectric tube.

3. An ozonator designed to produce ozone efficiently with minimum electrical power consumption, as claimed in claim 2, wherein said spacers comprise pieces of Teflon tape.

4. An ozonator designed to produce ozone efficiently with minimum electrical power consumption, as claimed in claim 3, wherein each outer tubular metal electrode and each inner tubular metal electrode comprises a stainless steel tube.

5. An ozonator designed to produce ozone efficiently with minimum electrical power consumption, as claimed in claim 4, wherein said electrical power supply is connected to ground each outer tubular metal electrode, and the periodic power supply is coupled to supply the periodic electrical power to each inner tubular metal electrode.

6. An ozonator designed to produce ozone efficiently with minimum electrical power consumption, as claimed in claim 5, wherein each glass dielectric tube comprises a borosilicate glass tube.

7. An ozonator designed to produce ozone efficiently with minimum electrical power consumption, as claimed in claim 6, wherein each glass dielectric tube has an outer diameter between 25 mm and 50 mm, and a length between 1 and 10 feet.

8. An ozonator designed to produce ozone efficiently with minimum electrical power consumption, as claimed in claim 7, wherein each inner tubular metal electrode has a 32 mm outside diameter, each glass dielectric tube has a 35 mm outer diameter and 33 mm inner diameter, and each outer tubular electrode has a 36 mm inner diameter.

9. An ozonator designed to produce ozone efficiently with minimum electrical power consumption, as claimed in claim 1, wherein each outer tubular metal electrode and each inner tubular metal electrode comprises a stainless steel tube with the inner tubular metal electrode capped on one end.

10. An ozonator designed to produce ozone efficiently with minimum electrical power consumption, as claimed in claim 1, wherein said electrical power supply is connected to ground each outer tubular metal electrode, and the periodic power is coupled to supply the periodic electrical power supply to each inner tubular metal electrode.

11. An ozonator designed to produce ozone efficiently with minimum electrical power consumption, as claimed in claim 1, wherein each glass dielectric tube comprises a borosilicate glass tube.

12. An ozonator designed to produce ozone efficiently with minimum electrical power consumption, as claimed in claim 1, wherein each glass dielectric tube has an outer diameter between 25 mm and 50 mm and a length between 1 and 10 feet.

13. An ozonator designed to produce ozone efficiently with minimum electrical power consumption, as claimed in claim 1, wherein each inner tubular metal electrode has a 32 mm outside diameter, each glass dielectric tube has a 35 mm outer diameter and 33 mm inner diameter, and each outer tubular electrode has a 36 mm inner diameter.

* * * * *